(12) United States Patent
Sexton

(10) Patent No.: US 6,671,783 B1
(45) Date of Patent: Dec. 30, 2003

(54) METHOD AND ARTICLE FOR MANAGING REFERENCES BETWEEN OBJECTS IN MEMORIES OF DIFFERENT DURATIONS IN A RUN-TIME ENVIRONMENT

(75) Inventor: Harlan Sexton, Palo Alto, CA (US)

(73) Assignee: Oracle Corp., Redwood Shores, CA (US)

( * ) Notice: Subject to any disclaimer, the term of this patent is extended or adjusted under 35 U.S.C. 154(b) by 552 days.

(21) Appl. No.: 09/639,795

(22) Filed: Aug. 17, 2000

Related U.S. Application Data

(60) Provisional application No. 60/160,759, filed on Oct. 21, 1999, provisional application No. 60/185,136, filed on Feb. 25, 2000, provisional application No. 60/185,139, filed on Feb. 25, 2000, provisional application No. 60/185,138, filed on Feb. 25, 2000, provisional application No. 60/185,134, filed on Feb. 25, 2000, provisional application No. 60/185,137, filed on Feb. 25, 2000, provisional application No. 60/185,135, filed on Feb. 25, 2000, provisional application No. 60/185,756, filed on Feb. 29, 2000, and provisional application No. 60/186,197, filed on Mar. 1, 2000.

(51) Int. Cl.[7] ............................................. G06F 12/00
(52) U.S. Cl. ..................... 711/147; 711/202; 711/216
(58) Field of Search ................................ 711/147, 202, 711/216

(56) References Cited

PUBLICATIONS

"A Real–Time Garbage Collector Based on the Lifetimes of Objects" by Lieberman et al., Communications of the ACM, vol. 26, No. 6 (Jun. 1983), pp. 419–429.

*Primary Examiner*—Reginald G. Bragdon
(74) *Attorney, Agent, or Firm*—Ditthavong & Carlson, P.C.

(57) ABSTRACT

A method and apparatus for referencing unshared memory in a run-time environment is provided. In one example of the invention, a method is provided for accessing a first object in unshared memory referenced by a second object in shared memory. Pages are allocated in a contiguous virtual address space. One of the pages is assigned to unshared memory. At least one of the other pages is assigned to shared memory, the second object having a reference to the first object, the reference being stored one of these other pages. A pointer is masked to the second object to produce a masked pointer. The first object is accessed based on the masked pointer.

16 Claims, 3 Drawing Sheets

METHOD AND ARTICLE FOR MANAGING REFERENCES BETWEEN OBJECTS IN MEMORIES OF DIFFERENT DURATIONS IN A RUN-TIME ENVIRONMENT

RELATED APPLICATIONS

The present application claims the benefit of the following U.S. Provisional Patent Applications, the contents of all of which are incorporated by reference in their entirety:

U.S. Provisional Patent Application Serial No. 60/160,759, filed on Oct. 21, 1999;

U.S. Provisional Patent Application Serial No. 60/185,136, filed on Feb. 25, 2000;

U.S. Provisional Patent Application Serial No. 60/185,139, filed on Feb. 25, 2000;

U.S. Provisional Patent Application Serial No. 60/185,138, filed on Feb. 25, 2000;

U.S. Provisional Patent Application Serial No. 60/185,134, filed on Feb. 25, 2000;

U.S. Provisional Patent Application Serial No. 60/185,137, filed on Feb. 25, 2000;

U.S. Provisional Patent Application Serial No. 60/185,135, filed on Feb. 25, 2000;

U.S. Provisional Patent Application Serial No. 60/185,756, filed on Feb. 29, 2000; and U.S. Provisional Patent Application Serial No. 60/185,197, filed on Mar. 1, 2000.

The present application is related to the following commonly-assigned, co-pending U.S. Patent Applications, the contents of all of which are incorporated by reference in their entirety:

U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al., now U.S. Pat. No. 6,457,019;

U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al., now U.S. Pat. No. 6,499,095;

U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al.;

U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al., now U.S. Pat. No. 6,434,685;

U.S. patent application Ser. No. 09/320,578 entitled METHOD AND ARTICLE FOR ACCESSING SLOTS OF PAGED OBJECTS, filed on May 27, 1999 by Harlan Sexton et al., now U.S. Pat. No. 6,401,185;

U.S. patent application Ser. No. 09/408,847 entitled METHOD AND ARTICLE FOR MANAGING REFERENCES TO EXTERNAL OBJECTS IN A RUNTIME ENVIRONMENT, filed on Sep. 30, 1999 by Harlan Sexton et al., now U.S. Pat. No. 6,564,223;

U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al.;

U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al.;

U.S. patent application Ser. No. 09/512,621 entitled SYSTEM AND METHODOLOGY FOR SUPPORTING A PLATFORM INDEPENDENT OBJECT FORMAT FOR A RUN-TIME ENVIRONMENT, filed on Feb. 25, 2000 by Harlan Sexton et al.;

U.S. patent application Ser. No. 09/512,618 entitled METHOD AND APPARATUS FOR MANAGING SHARED MEMORY IN A RUN-TIME ENVIRONMENT, filed on Feb. 25, 2000 by Harlan Sexton et al.; and U.S. patent application Ser. No. 09/512,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al.

FIELD OF THE INVENTION

The present invention relates to computer systems and, more particularly, to a method and article for managing references between objects in memories of different durations in a run-time environment.

BACKGROUND OF THE INVENTION

A dynamic run-time environment for a language such as JAVA™ is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment.

The state of a program, or "program state," is the set of the objects and the references between the objects that exist at a specific point in time during the execution of the program. A "reference" is used by a run-time environment to identify and ultimately access the region of memory for storing the data of the object. Typically, references between objects in a run-time environment are encoded using machine pointers. A machine pointer is a native datum that contains the address of the object in the main memory, which can be a real memory address or, more commonly, a virtual address on a machine that implements a virtual memory system.

"Virtual memory" refers to memory addressable by a storage allocation technique in which auxiliary storage, such as memory on a hard disk, can be addressed as though it were part of the main memory such as a RAM. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory.

A virtual address space is typically subdivided into a plurality of fixed-size contiguous sections of memory called "pages." Typically, some of the virtual memory pages for a process are specific to the process and cannot be shared with other processes, but, in some implementations, other virtual memory pages can be shared globally with other processes.

One popular run-time environment is a JAVA™ virtual machine, which supports a platform-independent, objectoriented language developed by Sun Microsystems. In JAVA, the attributes and methods for a class of objects are typically defined in a source file, which is compiled into an architecture-neutral object file containing bytecodes that are interpreted in the virtual machine at the target platform. It is common for objects to reference other objects.

Lately, there has been much interest in using JAVA in a multi-user environment that allows multiple users to connect in separate, concurrent sessions to a server system, such as a relational database system. When designing a run-time environment for such a multi-user environment, scalability in terms of the number of simultaneous users who can establish separate sessions is very important.

A significant constraint for user scalability is the size of the memory "footprint" that each session consumes. For example, a server system may have 100 Mb of memory for supporting all the user sessions. If the session memory footprint is 1 Mb, then only 100 user sessions can be supported at one time. Therefore, it is desirable to reduce the session memory footprint to improve scalability.

One approach for reducing the session memory footprint in a run-time environment is to allocate a single copy of objects, code, and data in a globally shared memory rather than in a session memory that is devoted to a single session. In the example, if 500 Kb of the 1 Mb session memory footprint can be shared between the different sessions, then 500 Kb of the total 100 Mb can be reserved as a global shared memory, and the remaining the 99.5 Mb would available for the individual session memories. Since the session memory requirements has dropped to 500 Kb, a total of 199 user sessions can now be supported. Consequently, session memory reduction by using globally shared memory is a promising approach for improving scalability of the multi-user run-time environment.

The globally shared memory approach cannot be easily applied for a large object wherein most of the object is potentially sharable, but some part of the object has a pointer to session-specific state. Since the value of the pointer varies from session to session, that value cannot be placed in a globally shared memory. Therefore, the large object cannot be placed in the globally shared memory as-is. Obviously, one way to address the difficulty associated with the shared object with a reference to a private object is to simply avoid putting such objects in the globally shared memory, thereby surrendering the benefits of session memory reduction, including user scalability.

Therefore, an indexing scheme has been developed, in which the large object is indeed placed in the global memory, but the reference to the session-private object is replaced with an index that is common to all the sessions. Each session contains a corresponding table that stores references to session-private objects at entries corresponding to the same index value. When this reference to the session-private object in the large object is deferenced, the index is used to identify the entry in the table to obtain the actual reference or pointer to the session-private object.

A drawback with this indexing scheme, however, is that finding the location of the table in the session memory can be expensive, thereby adversely affecting system performance of the run-time environment. For example, if the address of the table is maintained in a system hash table, the hash table lookup is an expensive computation, requiring a function call and many memory dereferencing operations. Therefore, there is a need for a computationally inexpensive procedure to locate the table of session-specific references from a globally shared object.

SUMMARY OF THE INVENTION

This and other needs are addressed by the present invention by having the virtual memory manager arrange for the shared and unshared pages to be allocated in such a way that the table of session-specific references can easily be located by performing an arithmetic operation on a pointer to an object in the shared memory. Consequently, performance is improved because expensive operations such as a function call or several deferences are avoided.

For example, contiguous virtual memory pages used by a session can be allocated in an aligned segment that comprises at least one unshared memory page (that holds the table of references to the session-specific objects) at a predetermined offset and a shared memory page. To reach the session-specific object from a shared object, a pointer to the shared object is masked to find the beginning of the segment, and the predetermined offset plus the offset to the table is then added to mask pointer to calculate the address of the table.

Accordingly, one aspect of the invention relates to a method and software for managing a run-time environment, in which multiple pages in a contiguous virtual address space are allocated. A predetermined page (such as the first page) is assigned to unshared memory, while at least one of the other pages is assigned to shared memory. The session-specific object, a reference to the object, a table containing a reference to an session-specific object, or a pointer to the table, or other indirect reference to the object, is stored in the predetermined page, and the shared object contains an index possibly encoded into the table for referencing the session-specific object.

Another aspect of the invention pertains to a method and software for accessing an session-specific object in an unshared memory that is referenced by a shared object in a shared memory. A pointer to the shared object is masked to produce a masked pointer that is, for example, aligned to the beginning of an aligned set of pages. The session-specific object is accessed based on the masked pointer, for example, through a table containing a reference to an session-specific object.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE PREFERRED EMBODIMENT

A method and apparatus for referencing unshared memory in a run-time environment is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
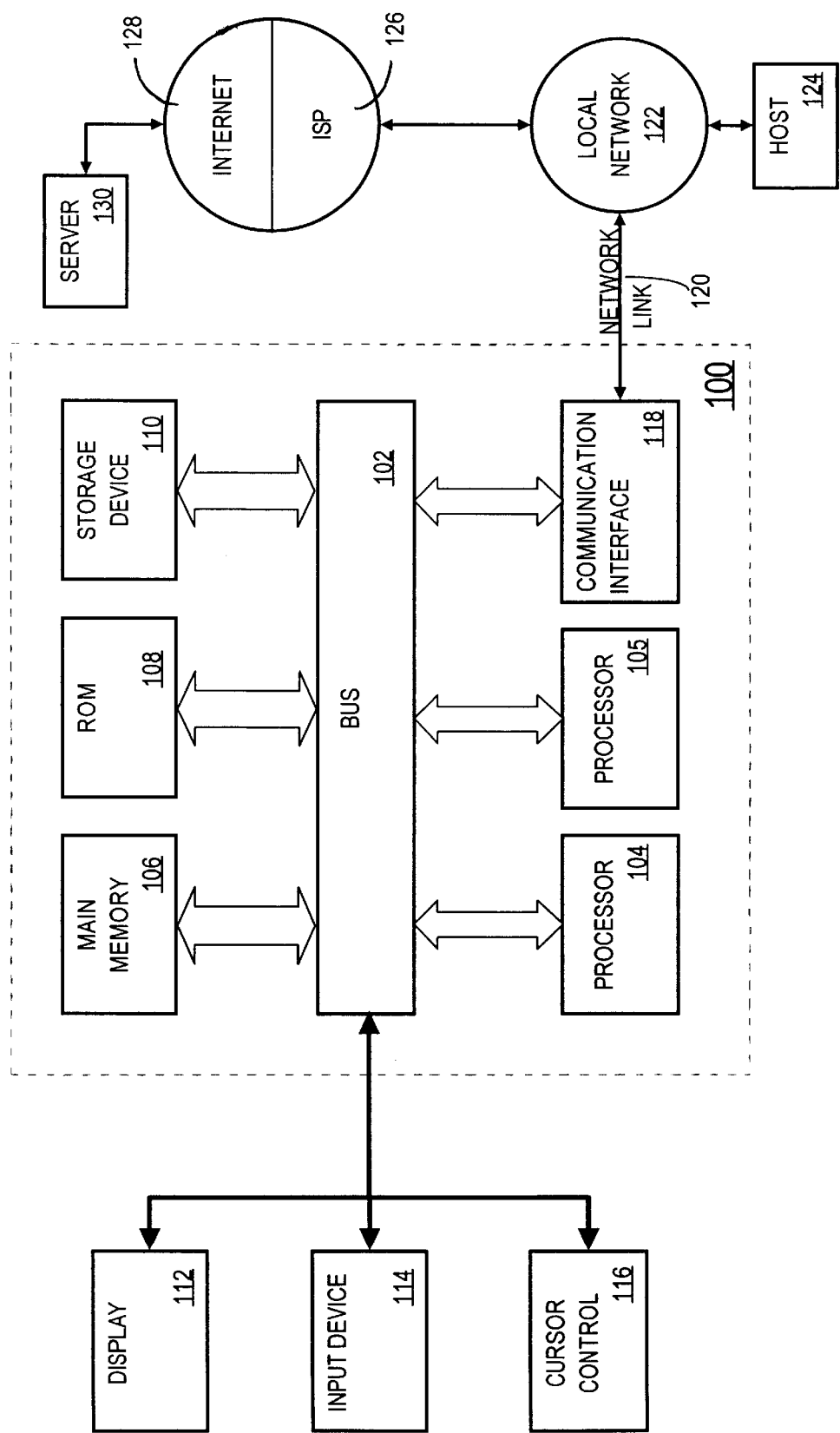
FIG. 1 is a block diagram that illustrates a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management in a run-time environment. According to one embodiment of the invention, managing memory in a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management in a run-time environment as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of concurrent user sessions on a processor 104. In some embodiments, shared memory is also accessible to concurrent user sessions on a plurality of processors, such as processors 104 and 105.

"Secondary storage" as used herein refers to storage elements, other than virtual memory, accessible to a process. Secondary storage may be local or networked. Local secondary storage, furnished by storage device 110 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

Shared and Unshared, Paged Memory

It is useful to divide the virtual address space for a process into a plurality of fixed-size contiguous chunks of memory called "pages." The page size, for example, is preferably in the range supported by popular computer systems, for example, from about 256 Bytes ($2^8$ Bytes) to about 32 kBytes ($2^{15}$ Bytes), and more preferably about 4 kbytes ($2^{12}$ Bytes).

Figure 2:
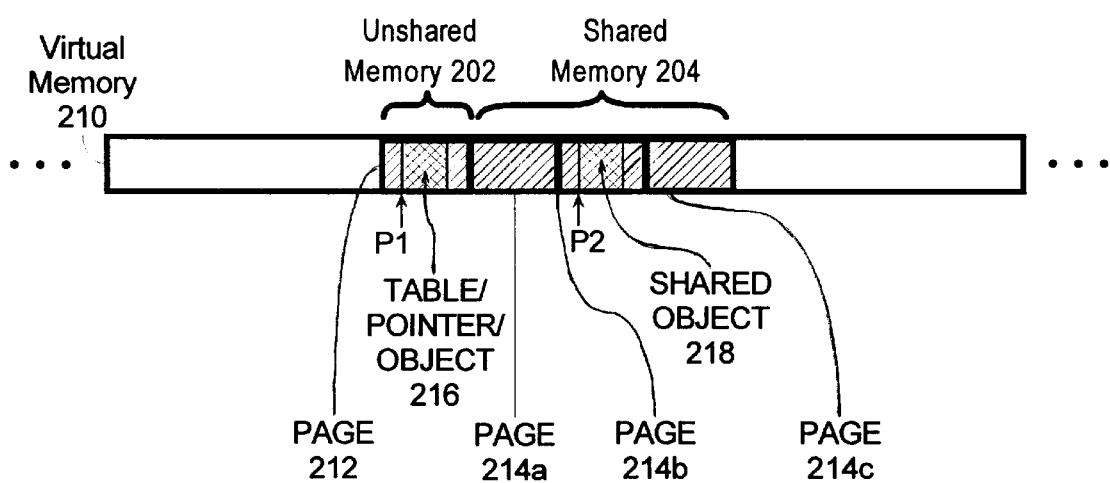
FIG. 2 shows a virtual address space, which includes an object memory having a page allocated to unshared memory and pages allocated to shared memory.

FIG. 2 shows a virtual address space 210, which includes an object memory comprising pages 212, 214a, 214b, and 214c. In the embodiment of FIG. 2, the pages are allocated in a contiguous virtual address space. A predetermined page with in the segment, page 212, preferably the first page, is assigned to unshared memory 202. Other pages (not shown) may also be assigned to unshared memory 202. The remaining pages, pages 214a, 214b, and 214c, are assigned to shared memory 204. FIG. 2 shows one page of unshared memory 202 and three pages of shared memory 204 for exemplary purposes. However, the embodiment is not so limited, as the arrangement and the number of pages depend on the specifications of the particular server implementing this embodiment.

A table 216 is located at an address indicated by P1 at a predetermined offset within page 212. Table 216 is located in the unshared memory 202 and contains references to session-specific objects in unshared memory 202 that the globally shared objects point to. Alternatively, a pointer to the table 216 is stored in the page 212 of the unshared memory 202. Shared object 218 is an example of such a globally shared object and is located at an address indicated by P2 within page 214b.

Figure 3:
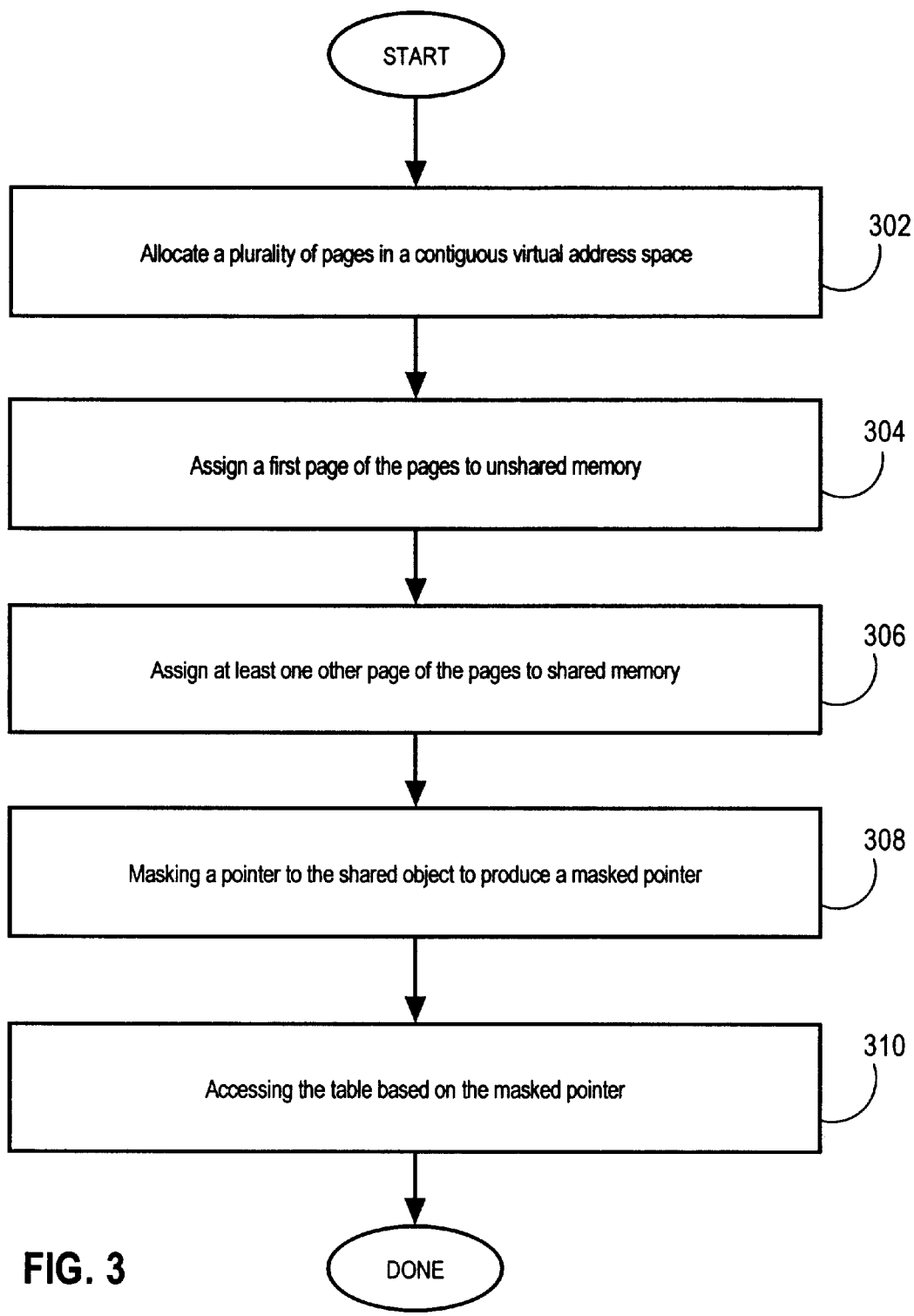
FIG. 3 shows a method for accessing an object in unshared memory referenced by an object in shared memory.

FIG. 3 shows a method for accessing table 216 in unshared memory referenced by the shared object 218 in shared memory. The method starts in step 302 where a plurality of pages is allocated in a segment of a contiguous virtual address space. As an example, in the embodiment of FIG. 2, four pages are allocated in a contiguous virtual address space. In a preferred embodiment, the segment of pages is aligned on a boundary at least as large as the segment size, i.e. a predetermined address (e.g. the first address) in the segment is a multiple of a power of two at least as large as the segment sized. In example, if the page size is 4 kBytes, the segment size of the four pages is 16 kBytes and the segment is aligned on at least a 16 kbyte-boundry.

Next, in step 304, a predetermined page 212 of the pages is assigned to unshared memory 202. As an example, in FIG. 2, the first page (i.e. page with the lowest virtual address) is the predetermined page 212. More than one page may be assigned to unshared memory. The method then proceeds to step 306, where at least one of the other pages is assigned to shared memory. As an example, in FIG. 2, pages 214a, 214b, and 214c are assigned to shared memory 204. Also in step 306, the shared object 218 is stored with a reference to an session-specific object. More specifically, the reference in the shared object 218 is an index into the table 216, which itself contains a reference to the session-specific object. Since the tables in each of the sessions contain parallel entries, the same index value is valid for the session-specific object notwithstanding the particular session being handled.

During run-time, it may become necessary to access the session-specific object in unshared memory 202 based on a machine pointer to the shared object 218 in shared memory 204. This may be necessary, for example, if the session-specific object is being used to store session-specific information that is related to the shared object 218.

Accordingly, in step 308, a pointer to the shared object 218 is masked to produce a masked pointer that has the value of the start of the page segment. To be more specific, the lower bits of the pointer to the shared object 218 indicate the offset between the start of the segment in which the page 214b of shared object 218 resides and the start of the shared object 218, and the higher bits indicate the address of the beginning of the segment. Since the table 216 is allocated at a predetermined location in the unshared page 212 and since the unshared page is located at a predetermined page in the segment, the table 216 can be located at a predetermined offset from the beginning of the segment.

Therefore, pointer to the table 216 can be obtained by extracting the bits of the pointer to the shared object 218 that indicate the beginning of the segment. There are a variety of techniques for masking the lower bits of the machine pointer, such as applying a logical AND operation to zero the lower bits and keeping the remaining bits set. The mask being used is based on the segment size. For example, if the segment is 1 Mb ($2^{20}$), then the mask have the lower 20-bits clear and the remaining bits set. Then, an appropriate, predetermined offset is added to (or logically ORed with) to the masked pointer to produce a pointer to the table 216. Such pointer arithmetic provides an efficient method of referencing the first object 216, which is in unshared memory 202. In step 310, the masked pointer is used to access the table 216 in unshared memory, e.g. using an index stored in the shared object 218 to obtain a reference to an session-specific object at the corresponding entry in the table. In an alternative embodiment in which only a pointer to the table is stored in the predetermined page 212, then the pointer to the table is deferenced to obtain the address of the table.

Note that by using pointer arithmetic as described above with reference to FIG. 3, time is saved by not having to make a function call or access a data structure, such as a lookup table, in order to generate the pointer to the table 216. Moreover, by doing such pointer arithmetic, the server does not have to access a hash table that has the data structure. By aligning pages at a $2^N$ boundary, the beginning of the object in unshared memory is readily determinable from masking a machine pointer to the shared object 218, which is in shared memory 204.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing a run-time environment, comprising the steps of:
    allocating a plurality of pages in a contiguous virtual address space;
    aligning the plurality of pages such that a predetermined address within the contiguous virtual address space of the pages is a power of two at least as large as a size of the pages;
    assigning a predetermined page of the pages to unshared memory;
    assigning at least one other page of the pages to shared memory;
    storing in the predetermined page a table or pointer to the table containing a reference to a session-specific object; and
    storing in the at least one other page a shared object containing an index into the table to reference the session-specific object.

2. A method for managing a run-time environment, comprising the steps of:
    allocating a plurality of pages in a contiguous virtual address space;
    assigning a predetermined page of the pages to unshared memory;
    assigning at least one other page of the pages to shared memory;
    storing in the predetermined page a table or pointer to the table containing a reference to a session-specific object, wherein the table or pointer to the table is stored at a predetermined location in the predetermined page; and
    storing in the at least one other page a shared object containing an index into the table to reference the session-specific object.

3. A method for managing a run-time environment, comprising the steps of:
    allocating a plurality of pages in a contiguous virtual address space;
    assigning a predetermined page of the pages to unshared memory;
    assigning at least one other page of the pages to shared memory;
    storing in the predetermined page a table or pointer to the table containing a reference to a session-specific object, wherein the predetermined page is a page having a lowest virtual address among the plurality of pages; and
    storing in the at least one other page a shared object containing an index into the table to reference the session-specific object.

4. In a system wherein a plurality of pages is allocated in a contiguous virtual address space, a predetermined page of the pages is assigned to unshared memory, and at least one other page of the pages is assigned to shared memory, a method for accessing an session-specific object in an unshared memory referenced by a shared object in a shared memory, said method comprising the computer-implemented steps of:
    masking a pointer to the shared object to produce a masked pointer; and
    accessing a table based on the masked pointer, said table containing a reference to the session-specific object.

5. The method according to claim 4, wherein the plurality of pages are aligned such that a predetermined address within the contiguous virtual address space of the pages is a power of two at least as large as a size of the pages.

6. The method according to claim 4, wherein the step of accessing the table includes the step of accessing a location in the predetermined page to fetch a pointer to the table.

7. The method according to claim 6, wherein the step of accessing the table further includes the step of determining the location in the predetermined page based on an index stored in the shared object.

8. The method according to claim 4, wherein the predetermined page is a page having a lowest virtual address among the plurality of pages.

9. A computer-readable medium bearing instructions for managing a run-time environment, said instructions being arranged to cause one or more processors upon execution thereby to perform the steps of:
    allocating a plurality of pages in a contiguous virtual address space;
    aligning the plurality of pages such that a predetermined address within the contiguous virtual address space of the pages is a power of two at least as large as a size of the pages;
    assigning a predetermined page of the pages to unshared memory;
    assigning at least one other page of the pages to shared memory;
    storing in the predetermined page a table or pointer to the table containing a reference to a session-specific object; and
    storing in the at least one other page a shared object containing an index into the table to reference the session-specific object.

10. A computer-readable medium bearing instructions for managing a run-time environment, said instructions being arranged to cause one or more processors upon execution thereby to perform the steps of:
    allocating a plurality of pages in a contiguous virtual address space;
    assigning a predetermined page of the pages to unshared memory;

assigning at least one other page of the pages to shared memory;

storing in the predetermined page a table or pointer to the table containing a reference to a session-specific object, wherein the table or pointer to the table is stored at a predetermined location in the predetermined page; and storing in the at least one other page a shared object containing an index into the table to reference the session-specific object.

11. A computer-readable medium bearing instructions for managing a run-time environment, said instructions being arranged to cause one or more processors upon execution thereby to perform the steps of:

allocating a plurality of pages in a contiguous virtual address space;

assigning a predetermined page of the pages to unshared memory;

assigning at least one other page of the pages to shared memory;

storing in the predetermined page a table or pointer to the table containing a reference to a session-specific object, wherein the predetermined page is a page having a lowest virtual address among the plurality of pages; and storing in the at least one other page a shared object containing an index into the table to reference the session-specific object.

12. In a system wherein a plurality of pages is allocated in a contiguous virtual address space, a predetermined page of the pages is assigned to unshared memory, and at least one other page of the pages is assigned to shared memory, a computer-readable medium bearing instructions for accessing an session-specific object in an unshared memory referenced by a shared object in a shared memory, said instructions being arranged to cause one or more processors upon execution thereby to perform the steps of:

masking a pointer to the shared object to produce a masked pointer; and accessing a table based on the masked pointer, said table containing a reference to the session-specific object.

13. The computer-readable medium according to claim 12, wherein the plurality of pages are aligned such that a predetermined address within the contiguous virtual address space of the pages is a power of two at least as large as a size of the pages.

14. The computer-readable medium according to claim 12, wherein the step of accessing the table includes the step of accessing a location in the predetermined page to fetch a pointer to the table.

15. The computer-readable medium according to claim 14, wherein the step of accessing the table further includes the step of determining the location in the predetermined page based on an index stored in the shared object.

16. The computer-readable medium according to claim 12, wherein the predetermined page is a page having a lowest virtual address among the plurality of pages.

* * * * *